United States Patent [19]

Lakey

[11] Patent Number: 4,979,633

[45] Date of Patent: Dec. 25, 1990

[54] OUTLET BOX PROTECTOR

[76] Inventor: Rodney E. Lakey, 4117 Plum St., Boise, Id. 83703

[21] Appl. No.: 279,544

[22] Filed: Dec. 5, 1988

[51] Int. Cl.$^5$ ............................................. B65D 51/00
[52] U.S. Cl. ................... 220/3.8; 174/65 R; 220/352
[58] Field of Search ............... 174/50, 65 G, 65 R, 174/65 SS, 66, 67; 220/3.2-3.95, 352

[56] References Cited

U.S. PATENT DOCUMENTS

| 946,646 | 1/1910 | Pratt | 220/3.8 |
|---|---|---|---|
| 2,987,909 | 6/1961 | Shlank | 220/3.8 |
| 2,990,969 | 7/1961 | Carson | 220/3.6 |
| 3,317,072 | 5/1967 | Zavertnik et al. | 220/3.8 |
| 3,601,276 | 8/1971 | Culpepper | 220/3.8 |
| 3,745,664 | 7/1973 | Altseimer | 220/3.8 |
| 4,295,575 | 10/1981 | Flachbarth | 220/3.8 |

FOREIGN PATENT DOCUMENTS

| 0088455 | 3/1921 | Switzerland | 220/3.8 |
|---|---|---|---|
| 0254498 | 7/1926 | United Kingdom | 220/3.8 |
| 0919741 | 2/1963 | United Kingdom | 220/3.8 |

Primary Examiner—Jimmy G. Foster

[57] ABSTRACT

An outlet box protector for protecting electrical outlet boxes of the type having a rectangular access and vertically spaced attachment ears, the protector constructed of a single sheet of resilient material, such as spring steel, to define two vertically spaced and opposing pairs of spring tabs engagable with the interior top and bottom surfaces of the outlet box enclosure; a protective plate located between the vertically spaced tabs; and a spring ear cover between each pair of laterally spaced tabs for abutting the outlet box ears to protect the ears from spackle or plaster. The plate presents a concave outer surface to prevent drills from biting into the material to protect electrical wiring within the outlet box as well as protecting the interior of the box from plaster or spackle.

16 Claims, 1 Drawing Sheet

OUTLET BOX PROTECTOR

BACKGROUND OF THE INVENTION

1. Field of the Invention

This invention relates, in general, to electrical outlet box protectors and, more particularly, to protectors for electrical wiring.

2. Description of the Prior Art

In building construction it is common procedure for electrical wiring to be strung and electrical outlet boxes to be in place before plastering or before laying of sheet rock. Often, during this process, the wiring is "hot" in that electricity is required at varying locations throughout the construction. During the laying of sheet rock, the location of the outlet box, in lying behind the sheet rock, is found by drilling a hole through the sheet rock at the estimated placement of the box. Should the drill engage the wiring, serious injury can result from the electrical shock.

Many outlet box protectors have been devised, including a temporary cover constructed of cardboard or resin plastic, U.S Pat No. 3,059,803, issued to W. V. Holsinger; a protector frictionally engaging the walls of the outlet box and extending outwardly of the box, as shown by U.S. Pat. No. 1,956,196, issued to H. E. Korab; and a protector constructed of cardboard material in which the electrical fixture is sold, as shown in U.S. Pat. No. 3,061,083, issued to H. Hubbell, Jr. Other relevant outlet box protectors are disclosed by F. S. Campbell, U.S. Pat. No. 3,015,408; H. Comroe, U.S. Pat. No. 2,895,634; F. M. Tomlin, U.S. Pat. No. 2,894,656; E. N. Allen et al, U.S. Pat. No. 2,204,006; and H. C. Troutman, U.S. Pat. No. 2,791,345. Protective covers extending out of the box prevent the drywall from being pushed flat against the box in order for a router to be used for cutting the drywall about the periphery of the box and also prevent conventional taping of any seams in the drywall adjacent the box. Protective covers of cardboard or the like are readily permeated by a drill. None of the references address the problem of electrical shock by drilling through sheet rock or plaster for finding the outlet box.

SUMMARY OF THE INVENTION

The present invention comprises an outlet box protector constructed of a single sheet of resilient, drill resistant material, defining a curved mid-section; two opposing pair of laterally spaced tabs in spring engagement with the interior end surfaces of an outlet box for holding the protector in place; and two vertically spaced, spring loaded covers, each cover located between respective, laterally spaced, tabs, for covering the attachment ears of the outlet box. The curved mid-section plate prevents a drill from biting into the protector and the cover protects the threaded portion of the ears of the outlet box from being filled with plaster. The unitary construction insures the integrity of the device and makes for cost efficiency.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
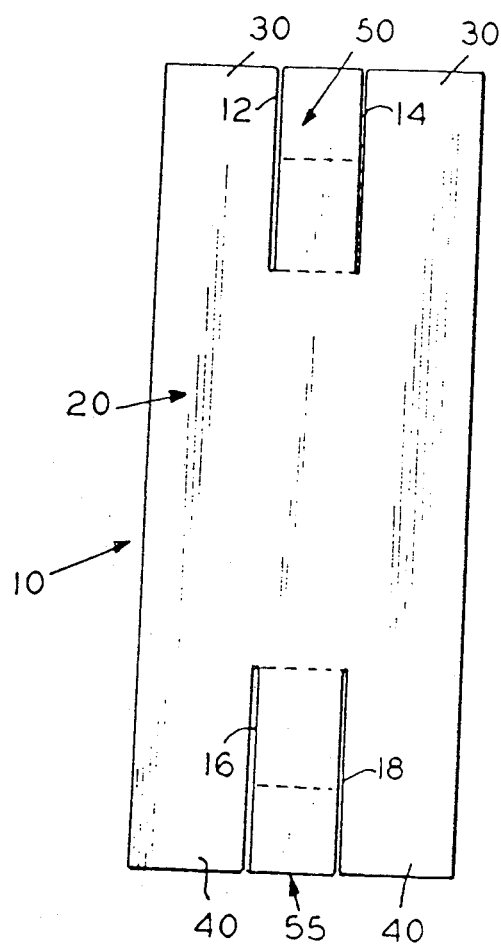
FIG. 1 is a plan view of a unitary blank for an outlet box protector made according to the present invention.

Referring now to the drawings, an embodiment to be preferred of an outlet box protector 10, made according to the present invention is disclosed. Protector 10 includes, generally, a plate 20; a first pair of box engaging tabs 30; a second pair of box engaging tabs 40; and a pair of ear covers designated by the numerals 50 and 55.

Referring to FIG. 1, in particular, it may be seen that protector 10 is constructed from a unitary blank of resilient drill resistant material such as spring steel or thermoplastic resin. The blank for standard outlet boxes is approximately one and seven-eights inches in width and has a length slightly in excess of four inches, being four and one-half inches in the embodiment shown. The blank is provided with two laterally spaced, parallel cuts 12 and 14 extending vertically lengthwise from the top and cuts 16 and 18, extending vertically lengthwise from the bottom, to define, respectively, a first pair of tabs 30 with ear cover 50 therebetween; a second pair of tabs 40 with ear cover 55 therebetween; and a mid-section, plate 20. The entire blank is then curved by any appropriate means to the approximate shape shown in FIG. 3; the front surface 25 of the plate being concave and the parallel back surface 27 being convex. Ear covers 50 and 55 are then curved outwardly to a greater degree in the direction of the concavity and the endmost portions 51 and 56 of covers 50 and 55, respectively, are bent to a substantially vertical, planar position to one another, at the approximate place shown by the dotted lines in FIG. 1, to abut respective ears of the outlet box, when the protector is in place.

Figure 2:
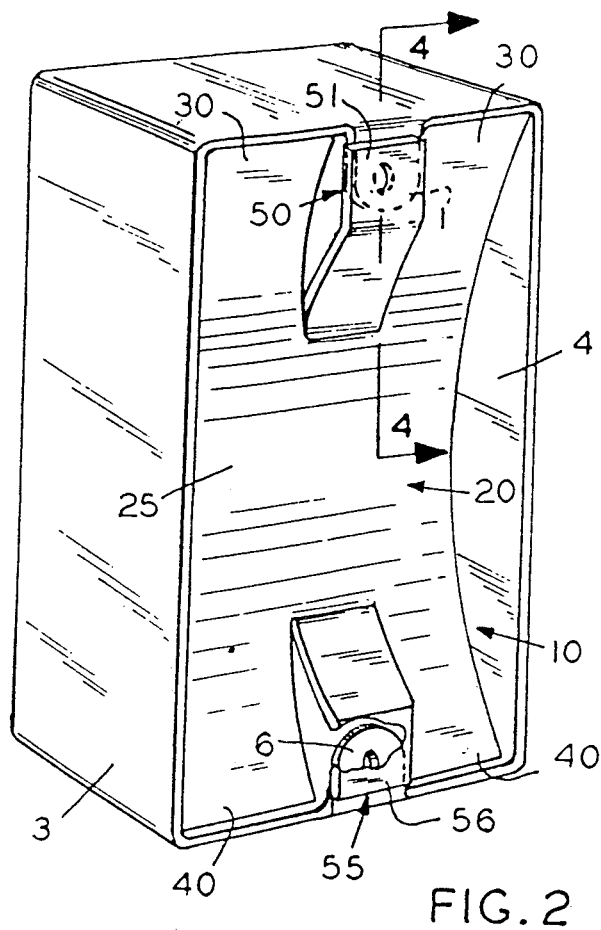
FIG. 2 is a perspective view of the protector shown mounted within an outlet box.
Figure 3:
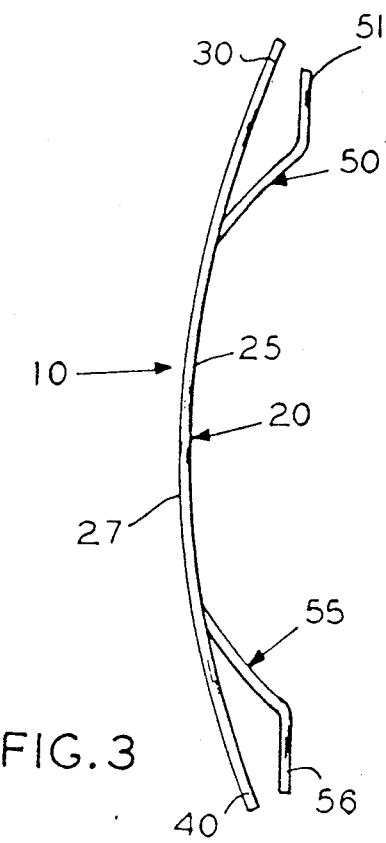
FIG. 3 is a side view of the protector.
Figure 4:
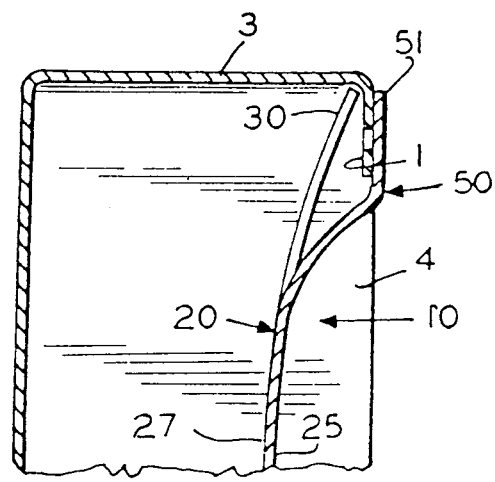
FIG. 4 is a sectional view taken along lines 4—4 of FIG. 2.

Referring now to FIG. 2, placement of protector 20 within an outlet box 3, is shown to advantage. Assuming the protector is constructed of spring steel and is curved in vertical cross-section, as shown in FIGS. 2 and 3, the protector is simply flexed along the lines of curvature by pushing the protector into enclosure 4 of the outlet box until portions 51 and 56 of ear covers 50 and 56 are, in being resilient, in firm spring-loaded engagement with ears 1 and 6, respectively, of the outlet box. In this position, the first pair of box engaging tabs 30 are resiliently compressed against the top inside surface of the box and the second pair of box engaging tabs 40 are resiliently compressed against the bottom inside surface of the outlet box. It will be noted that the mid-section, plate 20, of the protector presents a concave outer surface 25 to any drill which may be used in finding the box to prevent the drill from gaining a "bite" into the steel surface and that the entire protector, except the thin ear covers covering the attachment ears of the box, is within the confines of the box enclosure and the protector, therefore, does not prevent drywall from being pushed flush against building studs. Once the sheet rock or drywall is pushed into place about the box and once all plastering or spackling has dried, protector 10 is simply removed and is reuseable, as desired.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A protector for an electrical outlet box of the type having a rectangular access opening and vertically spaced attachment ears, said protector comprising:
   an elongated, resilient, plate having parallel front and rear surfaces, said plate curved in cross section;
   a first pair of resilient box engaging tabs, laterally spaced, and affixed to the top of said plate;
   a second pair of resilient box engaging tabs, laterally spaced, and affixed to the bottom of said plate; and
   a pair of resilient, vertically spaced, ear covers, each of said covers located between respective pairs of tabs.

2. The protector as described in claim 1 wherein said plate is curved in vertical cross section.

3. The protector as described in claim 2 wherein said front surface of said plate is concave.

4. The protector as described in claim 1 wherein said plate; tabs; and ear covers are unitary.

5. The protector as described in claim 4 wherein said protector is constructed of drill resistant material.

6. The protector as described in claim 5 wherein said material is steel.

7. The protector as described in claim 5 wherein said material is thermoplastic resin.

8. A protector for an electrical outlet box of the type having a rectangular access opening and vertically spaced attachment ears, said protector comprising:
   an elongated, resilient, plate having parallel front and rear surfaces, said plate curved in cross section;
   a first pair of resilient box engaging tabs, laterally spaced, and affixed to the top of said plate;
   a second pair of resilient box engaging tabs, laterally spaced, and affixed to the bottom of said plate; and
   a pair of resilient, vertically spaced, ear covers, each of said covers located between respective pairs of tabs; and said plate, tabs, and ear covers being constructed of unitary drill resistant material.

9. The protector as described in claim 8 wherein said plate is curved in vertical cross section.

10. The protector as described in claim 9 wherein said front surface of said plate is concave.

11. The protector as described in claim 8 wherein said material is steel.

12. The protector as described in claim 8 wherein said material is thermoplastic resin.

13. A protector for an electrical outlet box of the type having a rectangular access opening and vertically spaced attachment ears, said protector comprising:
   a rectangular sheet of resilient material having parallel front and rear surfaces, said sheet having two parallel laterally spaced cuts from top toward bottom to define a first pair of box engaging tabs with an ear cover therebetween, and two parallel laterally spaced cuts from bottom toward top to define a second pair of box engaging tabs with an ear cover therebetween; said sheet bowed to define a front concave surface and a rear convex surface and said ear covers having a portion thereof bent substantially to vertical to cover the attachment ears of the outlet box.

14. The protector as described in claim 13 wherein said material is drill resistant.

15. The protector as described in claim 13 wherein said material is of spring steel.

16. The protector as described in claim 13 wherein said material is thermosplastic resin.

* * * * *